(12) United States Patent
Huffer

(10) Patent No.: US 9,809,368 B2
(45) Date of Patent: Nov. 7, 2017

(54) RESEALABLE BLISTER PACKAGE

(71) Applicant: SONOCO DEVELOPMENT, INC., Hartsville, SC (US)

(72) Inventor: Scott William Huffer, Hartsville, SC (US)

(73) Assignee: SONOCO DEVELOPMENT, INC., Hartsville, SC (US)

(*) Notice: Subject to any disclaimer, the term of this patent is extended or adjusted under 35 U.S.C. 154(b) by 0 days.

(21) Appl. No.: 14/547,605

(22) Filed: Nov. 19, 2014

(65) Prior Publication Data

US 2016/0137375 A1    May 19, 2016

(51) Int. Cl.
*B65D 75/36*    (2006.01)
*B65D 65/14*    (2006.01)
(Continued)

(52) U.S. Cl.
CPC .............. *B65D 75/36* (2013.01); *B29C 65/02* (2013.01); *B29C 65/4805* (2013.01); *B65D 65/14* (2013.01); *B65D 65/40* (2013.01); *B65D 75/5816* (2013.01); *B65D 77/206* (2013.01); *B65D 77/2096* (2013.01); *B29L 2031/712* (2013.01); *B32B 1/00* (2013.01);
(Continued)

(58) Field of Classification Search
CPC ...... B65D 2075/362; B65D 2517/5083; B65D 2575/36; B65D 2575/368; B65D 2575/367; B65D 2575/365; B65D 75/36; B65D 75/325; B65D 75/326; B65D 75/327; B65D 75/366; B65D 75/5805; B65D 75/5816; B65D 75/5827–75/585; B65D 75/5838; B65D 75/5855; B65D 83/0088

USPC ........................................ 206/467; 220/359.2
See application file for complete search history.

(56) References Cited

U.S. PATENT DOCUMENTS 3,335,939 A    8/1967   Robinson, Jr.
3,454,210 A    7/1969   Spiegel et al.
(Continued)

FOREIGN PATENT DOCUMENTS

EP    2 108 507 A1    10/2009
FR    2 503 036 A1    10/1982

OTHER PUBLICATIONS

International Search Report and Written Opinion for Application No. PCT/IB2015/058926 dated Feb. 15, 2016.

*Primary Examiner* — Anthony Stashick
*Assistant Examiner* — Mollie Impink
(74) *Attorney, Agent, or Firm* — Nelson Mullins Riley & Scarborough LLP

(57) ABSTRACT

A resealable blister package is described that includes a receiving member and a peelable lidding member. The receiving member has a cavity that can hold items, such as consumer products, and the peelable lidding member can be attached to a peripheral portion of the receiving member to seal the items within the cavity. The peelable lidding member includes a first film layer and a second film layer that are laminated via an adhesive layer. The blister package is designed to be opened to provide access to the cavity and the items therein by peeling the peelable lidding member away from the receiving member. The peelable lidding member can be resealed to the receiving member by bringing the lidding member back into contact with exposed portions of the adhesive layer remaining on the peripheral portion of the receiving member.

6 Claims, 5 Drawing Sheets

(51) Int. Cl.

| | | |
|---|---|---|
| *B65D 65/40* | (2006.01) | |
| *B65D 75/58* | (2006.01) | |
| *B29C 65/02* | (2006.01) | |
| *B29C 65/48* | (2006.01) | |
| *B65D 77/20* | (2006.01) | |
| *B29L 31/00* | (2006.01) | |
| *B32B 7/04* | (2006.01) | |
| *B32B 7/06* | (2006.01) | |
| *B32B 7/12* | (2006.01) | |
| *B32B 27/08* | (2006.01) | |
| *B32B 27/36* | (2006.01) | |
| *B32B 1/00* | (2006.01) | |
| *B32B 3/10* | (2006.01) | |
| *B32B 3/26* | (2006.01) | |
| *B32B 37/12* | (2006.01) | |
| *B32B 38/00* | (2006.01) | |
| *B32B 38/04* | (2006.01) | |

(52) U.S. Cl.
CPC . *B32B 3/10* (2013.01); *B32B 3/26* (2013.01); *B32B 7/045* (2013.01); *B32B 7/06* (2013.01); *B32B 7/12* (2013.01); *B32B 27/08* (2013.01); *B32B 27/36* (2013.01); *B32B 37/1284* (2013.01); *B32B 38/145* (2013.01); *B32B 2038/045* (2013.01); *B32B 2255/10* (2013.01); *B32B 2255/205* (2013.01); *B32B 2255/26* (2013.01); *B32B 2307/31* (2013.01); *B32B 2307/4023* (2013.01); *B32B 2307/738* (2013.01); *B32B 2307/748* (2013.01); *B32B 2553/00* (2013.01); *B65D 2575/368* (2013.01); *B65D 2577/2083* (2013.01); *B65D 2577/2091* (2013.01)

(56) References Cited

U.S. PATENT DOCUMENTS

| | | | |
|---|---|---|---|
| RE27,361 E | | 5/1972 | Miller |
| 3,910,410 A | | 10/1975 | Shaw |
| 4,735,335 A | * | 4/1988 | Torterotot ............... B32B 15/08 220/260 |
| 4,762,230 A | * | 8/1988 | Croce ................ B65D 33/1691 206/469 |
| 5,899,333 A | | 5/1999 | Williams et al. |
| 6,056,141 A | | 5/2000 | Navarini et al. |
| 6,726,054 B2 | * | 4/2004 | Fagen ................. B65D 75/366 206/449 |
| 7,681,732 B2 | * | 3/2010 | Moehlenbrock .......... B32B 7/12 206/459.1 |
| 8,256,636 B2 | | 9/2012 | Huffer |
| 8,551,588 B2 | | 10/2013 | Daffner et al. |
| 2004/0013827 A1 | | 1/2004 | Zuser et al. |
| 2009/0178945 A1 | | 7/2009 | Moehlenbrock et al. |
| 2010/0172604 A1 | * | 7/2010 | Andersson ........... B65D 75/366 383/211 |
| 2013/0020328 A1 | | 1/2013 | Duan et al. |

* cited by examiner

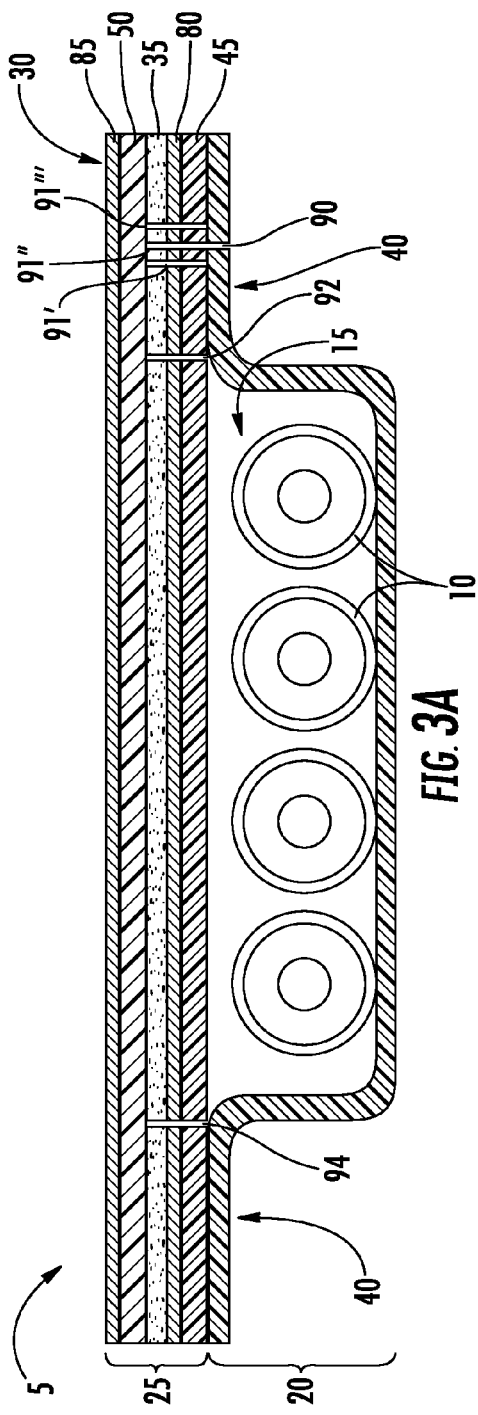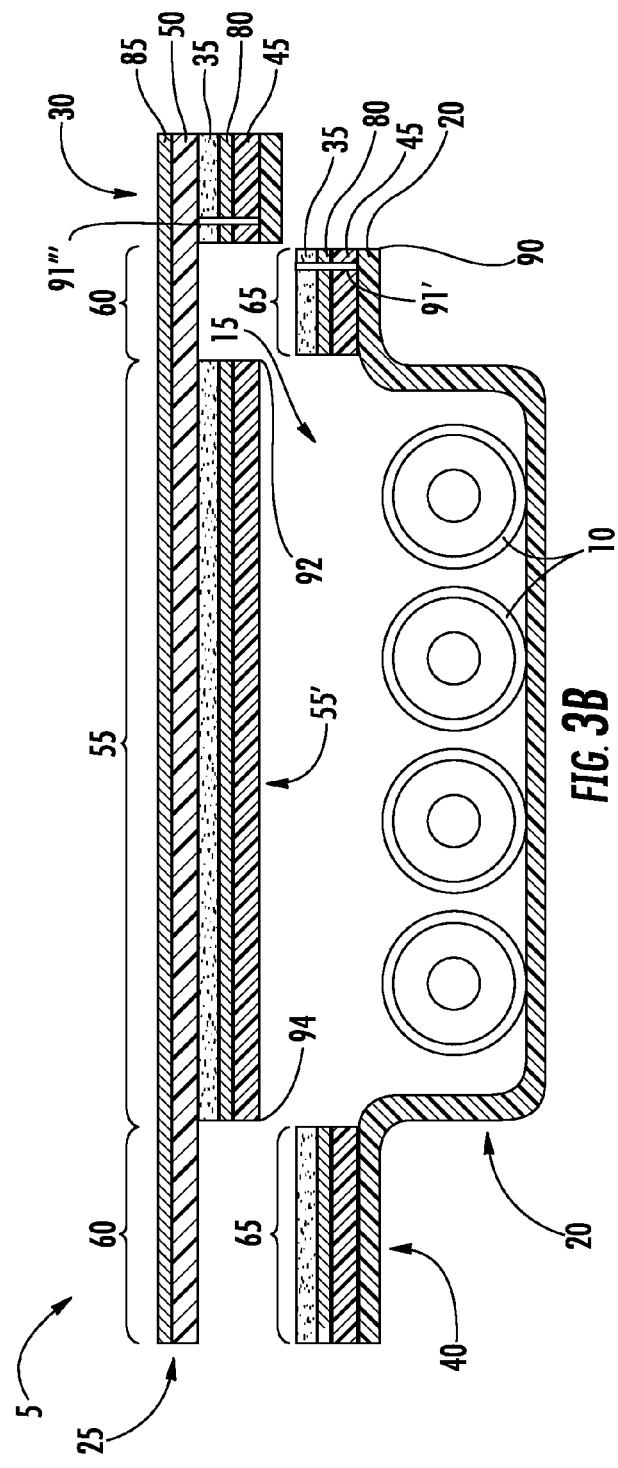

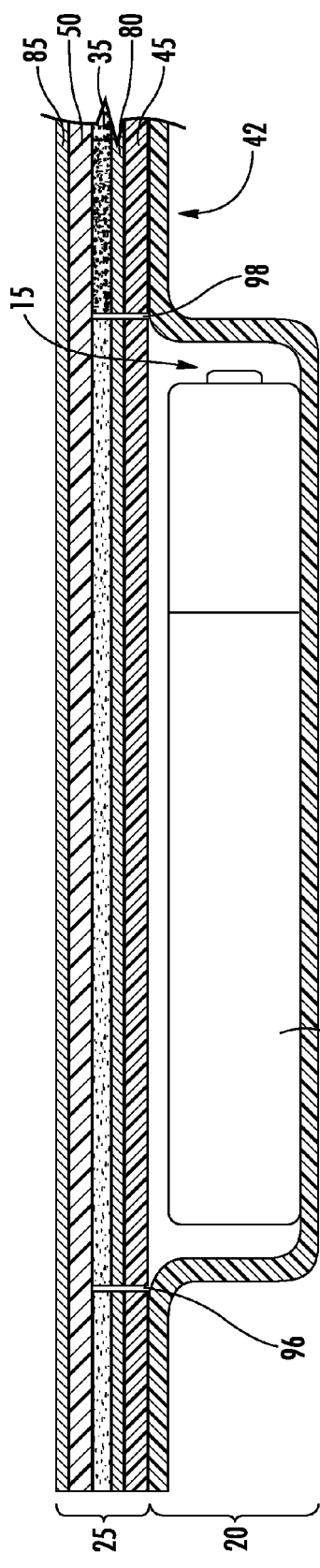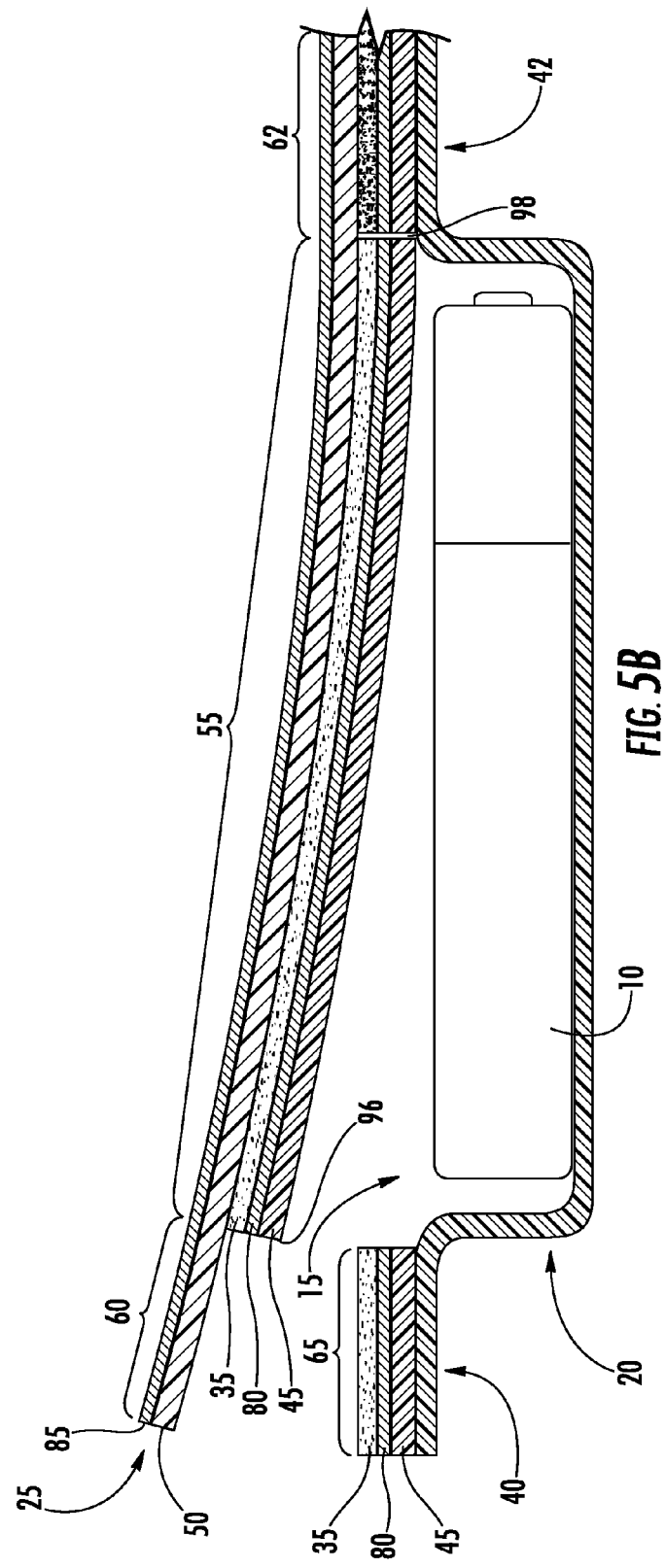

RESEALABLE BLISTER PACKAGE

TECHNICAL FIELD

The present disclosure relates in general to packaging for products, and more particularly to packaging constructed from flexible film-based materials. The disclosure is especially concerned with blister packages with a peelable portion that can be resealed to the package for keeping contents stored within the package.

BACKGROUND

A blister package is a type of flexible packaging that is frequently used to hold small consumer goods, food, and/or pharmaceuticals (e.g., pills). Often, a thermoformed plastic web is used to form a tray having a cavity in which the item is placed, and the item is enclosed within the package either by sealing the tray to a header card (e.g., a paperboard backing) or to a flexible lidding made of plastic or aluminum foil. In still other cases, the thermoformed plastic tray is folded onto itself and/or sealed on all sides to contain the item between two portions of the web, creating a clamshell type of packaging.

BRIEF SUMMARY

Conventional blister packages of the type described above present various problems, which embodiments of the claimed invention attempt to address. Often, conventional blister packages are difficult for a consumer to open and require a sharp object, such as a knife or scissors, to be used to puncture and/or remove the backing or lidding to access the cavity containing the product. In addition to the risk of injury, the result of a opening a conventional blister package is typically the destruction of the package itself. There is virtually no convenient way to reseal a conventional blister package once it has been opened, and even those blister packages that have been opened with the utmost care and control require tape or some other external means of adhering the different portions together to be able to hold any remaining contents of the package within the package for future use.

Embodiments of the invention described herein provide improved blister packages and methods for manufacturing the blister packages that are easy for a consumer to open relative to conventional packages and can be resealed to facilitate storage of the product within the package for future consumption. In particular, a blister package is described that includes a receiving member defining a cavity configured to hold an item therein and a peripheral portion at least partially surrounding the cavity, wherein the receiving member comprises a thermoformable material, and a peelable lidding member attached to the peripheral portion of the receiving member and configured to cover the cavity and retain the item therein. The lidding member may comprise a first film layer comprising a heat sealable polyester material configured to be attached to the peripheral portion of the receiving member and a second film layer comprising a metallized polyester material laminated to the first film layer via an adhesive layer. The blister package may be configured to be opened to provide access to the cavity and the item therein by peeling the peelable lidding member away from the receiving member. A first portion of the second film layer may be configured to remain adhered to the first film layer in a location corresponding to the cavity, such that the first film layer is removed with the first portion from the location corresponding to the cavity when the peelable lidding member is peeled away from the receiving member so as to provide access to the item therein. A second portion of the second film layer may be configured to be separated from the adhesive layer in a location corresponding to at least part of the peripheral portion as the blister package is opened, with the adhesive layer remaining on the first film layer, such that the peelable lidding member is resealable to the receiving member when the second portion of the second film layer is moved into contact with a corresponding exposed portion of the adhesive layer.

In some cases, the receiving member may comprise glycol-modified polyethylene terephthalate (PETG). The first film layer may comprise polyethylene terephthalate (PET), and/or the second film layer may comprise metallized polyethylene terephthalate (mPET). The adhesive layer may comprise pressure sensitive adhesive.

In some embodiments, the blister package may further comprise an ink layer disposed between the first film layer and the adhesive layer. In other embodiments, an ink layer may be disposed on an outer surface of the second film layer. The blister package may include at least one cut line arranged in a transverse direction with respect to the first and second film layers. The at least one cut line may comprise a first cut line that defines a break tab in the peripheral portion, and the break tab may be configured to be gripped by a user for peeling the peelable lidding member away from the receiving member.

The at least one cut line may further comprise a second cut line defined on a first edge of the cavity and a third cut line substantially parallel to the second cut line and defined on a second edge of the cavity, opposite the first edge, wherein the second and third cut lines are defined through at least a thickness of the first film layer and define a first portion of the first film layer that is configured to remain adhered to the first portion of the second film layer. The at least one cut line may further comprise a fourth cut line extending between the second and third cut lines along a third edge of the cavity, wherein the fourth cut line may be defined through at least a thickness of the first film layer and, with the second and third cut lines, may form a substantially continuous cut along a portion of the perimeter of the cavity, thereby allowing the first film layer to be removed with the second film layer via the adhesive layer to provide access to the cavity when the peelable lidding member is peeled away from the receiving member.

In still other embodiments, a method of manufacturing a blister package is provided in which a receiving member is thermoformed, wherein the receiving member defines a cavity configured to hold an item therein and a peripheral portion at least partially surrounding the cavity. A first film layer may be laminated to a second film layer via an adhesive layer to form a peelable lidding member. The peelable lidding member may be heat sealed to the peripheral portion of the receiving member, and a cut line may be defined in a transverse direction with respect to the first and second film layers, wherein the cut line passes through at least the receiving member and the first film layer so as to define a break tab in the peripheral portion. The break tab may be configured to be gripped by a user for peeling the peelable lidding member away from the receiving member to provide access to the cavity and the item therein. The peelable lidding member may be configured to be resealed to the receiving member via the adhesive layer.

In some cases, the first film layer may comprise a heat sealable polyester material configured to be heat sealed to the peripheral portion of the receiving member. The second film layer may, for example, comprise a metallized polyester material adhered to the first film layer via the adhesive layer. The first film layer may be laminated to the second film layer by flood coating the first film layer with a pressure sensitive adhesive. Additionally or alternatively, the method may include reverse-printing an ink layer on the first film layer and applying the adhesive layer over the ink layer. An ink layer may be printed on an outer surface of the second film layer. Moreover, the cut line may be a first cut line, and the method may further include forming a second cut line on a first edge of the cavity and forming a third cut line substantially parallel to the second cut line and defined on a second edge of the cavity, opposite the first edge, wherein the second and third cut lines are defined through at least a thickness of the first film layer and facilitate access to the cavity when the peelable lidding member is peeled away from the receiving member.

The cut line may be a first cut line, and the method may further include forming a second cut line on a first edge of the cavity and forming a third cut line substantially parallel to the second cut line and defined on a second edge of the cavity, opposite the first edge, wherein the second and third cut lines are defined through at least a thickness of the first film layer and facilitate access to the cavity when the peelable lidding member is peeled away from the receiving member. Moreover, the receiving member may comprise glycol-modified polyethylene terephthalate (PETG); the first film layer may comprise polyethylene terephthalate (PET); and/or the second film layer may comprise metallized polyethylene terephthalate (mPET).

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 3A is a cross-sectional view of the blister package of FIG. 2A along line 3A-3A according to an example embodiment;

FIG. 3B is a cross-sectional view of the blister package of FIG. 2B along line 3B-3B according to an example embodiment;

FIG. 5A is a cross-sectional view of the blister package of FIG. 2A along line 5A-5A according to an example embodiment; and FIG. 5B is a cross-sectional view of the blister package of FIG. 2B along line 5B-5B according to an example embodiment.

DETAILED DESCRIPTION OF THE DRAWINGS

Figure 1:
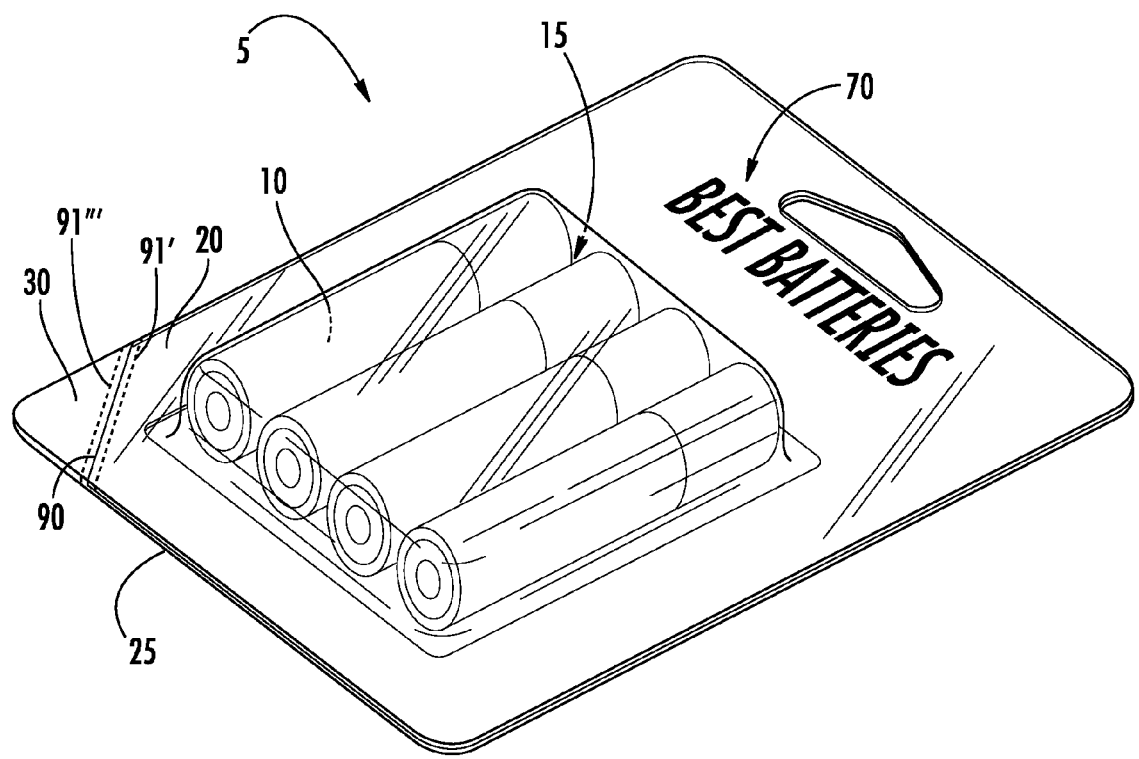
FIG. 1 is a front perspective view of a blister package according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements Like numbers refer to like elements throughout.

As noted above, conventional blister packages typically include a thermoformed tray in which a cavity is defined for holding an item. The tray, which may be made from a thermoformable plastic, can have one or more cavities that are shaped to accommodate the item or items to be held therein and may be designed to hold the item in a position that is convenient for display to a consumer for possible purchase.

After the item has been placed within the tray, a header card (e.g., a paperboard backing) or a flexible lidding made of plastic or aluminum foil may be applied to the tray to secure the item therein. The card or lidding may, for example, be heat sealed or otherwise secured to the tray. In some cases, the card or lidding may include printed matter, such as the name of the product held in the package, instructions for use, cautionary information, or other information for the consumer to review.

As described above, however, conventional blister packages present various obstacles to the consumer. For example, conventional blister packages can be difficult for a consumer to open. A consumer may need to use a sharp object, such as a knife or scissors, to puncture the backing or lidding and/or separate the backing or lidding from the tray to an extent sufficient to allow the consumer to access the cavity containing the product. In addition to the risk of injury, the result of opening a conventional blister package is typically the destruction of the package itself. For example, the backing may be torn; the printed matter (e.g., instructions for use) may be compromised or obscured; and/or the tray itself may be deformed or damaged in the process of opening the package. Moreover, in some cases, use of a sharp object to open the package may run the risk of causing damage to the item held inside.

In addition, once opened, there is virtually no convenient way to reseal a conventional blister package. Even those blister packages that have been opened with the utmost care and control require tape or some other additional means of re-securing the tray to the backing or lidding member, and packages that have been resealed in such a manner may be difficult to re-open or may not be resealed securely enough to hold the item therein for future use (e.g., the package may become loose and the item may fall out over time).

Through ingenuity and hard work, the inventors developed a resealable blister package that includes a receiving member and a peelable lidding member. The receiving member has a cavity that can hold items, such as consumer products, and the peelable lidding member can be attached to a peripheral portion of the receiving member to seal the items within the cavity. The blister package is designed to be opened to provide access to the cavity and the items therein when the peelable lidding member is peeled away from the receiving member. The peelable lidding member can be resealed to the receiving member by bringing the lidding member back into contact with exposed portions of an adhesive layer that is designed to remain on the peripheral portion of the receiving member, as described in greater detail below.

Turning now to FIG. 1, a blister package 5 according to embodiments of the invention is shown, in which an item 10 (e.g., batteries in this case) is stored within a cavity 15 formed by a receiving member 20, between the receiving member and a peelable lidding member 25. A break tab 30 may be provided, such as at a corner of the package, to facilitate peeling of the peelable lidding member 25 from the receiving member 20 and/or to serve as a tamper evident feature, as described in greater detail below.

Figure 2A:
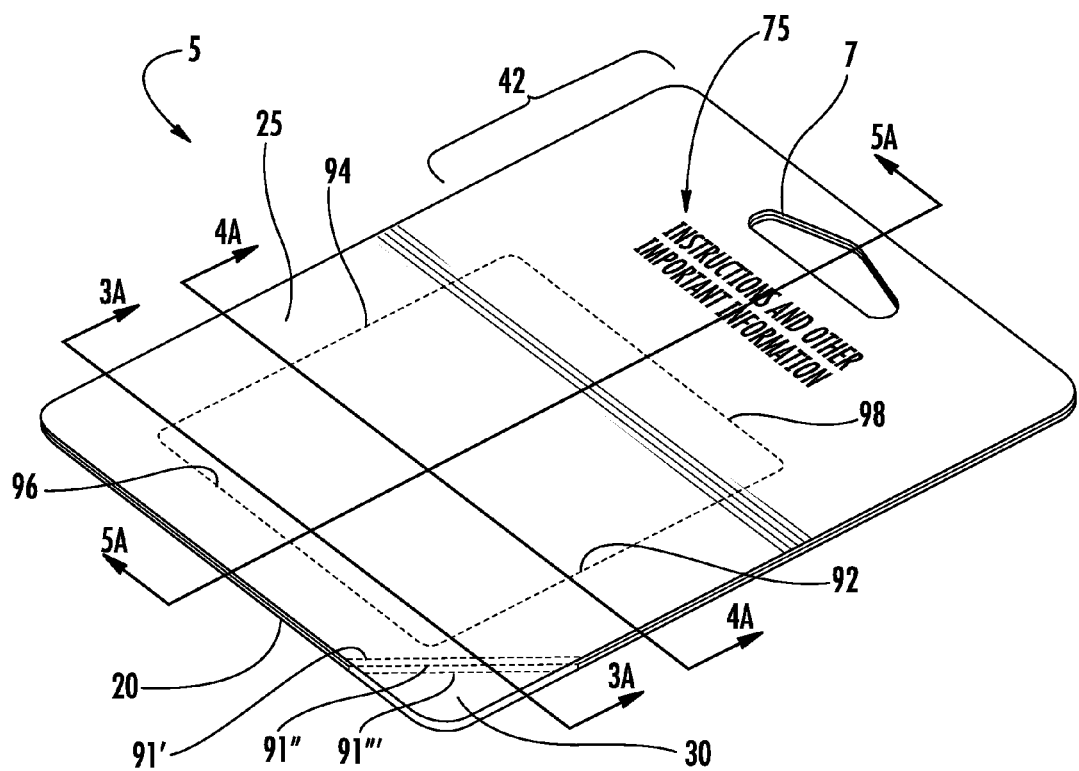
FIG. 2A is a rear perspective view of a blister package with the peelable lidding member in a closed position according to an example embodiment.
Figure 2B:
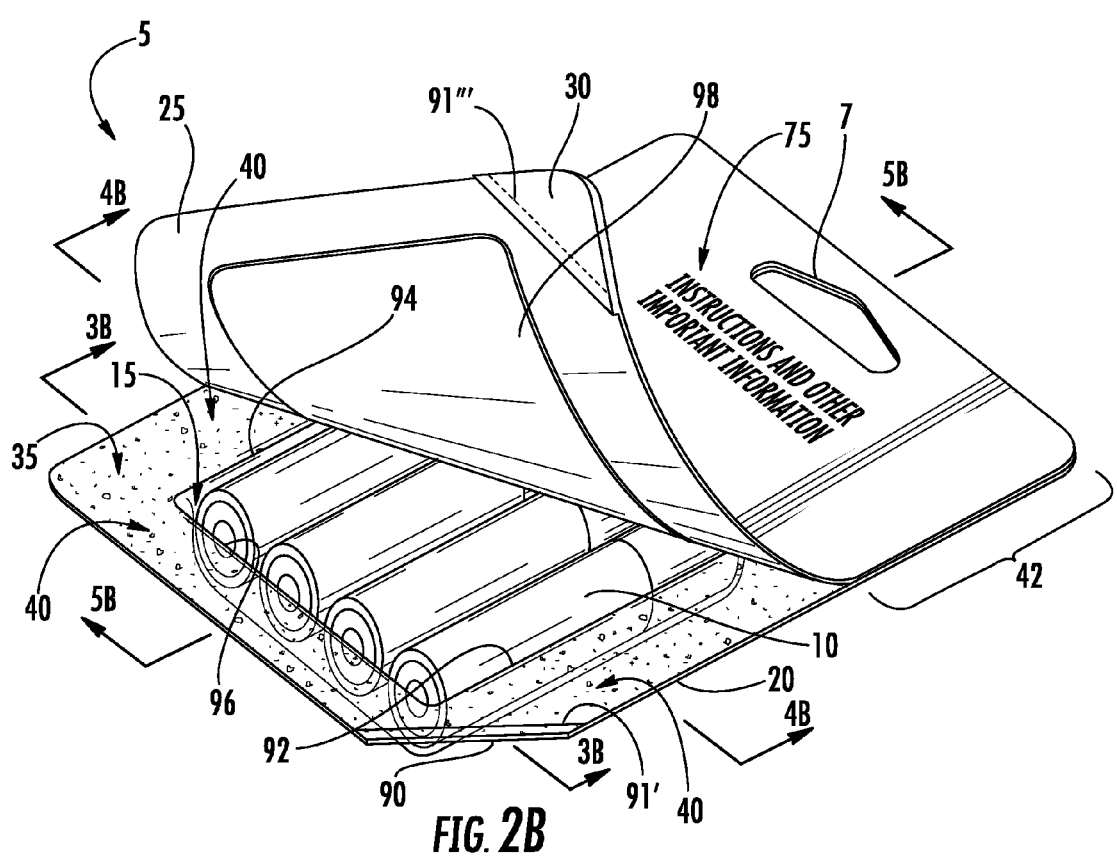
FIG. 2B is a rear perspective view of a blister package with the peelable lidding member in an open position according to an example embodiment.

FIGS. 2A and 2B show the blister package 5 of FIG. 1 from a back side of the package. In FIG. 2A, the blister package 5 is in a closed position, whereas in FIG. 2B the package is in a partially open position (e.g., the package is in the process of being opened by the user to provide access to the item 10 (batteries) held inside. Embodiments of the blister package 5 allow a user to grip the break tab 30 and pull the tab in a direction away from the receiving member 20, as shown in FIG. 2B. As described in greater detail below, an adhesive layer 35 (e.g., pressure sensitive adhesive) may be provided on a surface of the receiving member 20 in such a way that the adhesive layer remains on the surface of the receiving member when the peelable lidding member 25 is pulled off. Thus, by moving the peelable lidding member 25 back towards and into contact with the receiving member 20, the peelable lidding member may be re-adhered to the receiving member, thereby maintaining the item 10 within the package for future use.

According to some embodiments, as mentioned above and with reference to FIGS. 2A and 2B, the blister package 5 may comprise a receiving member 20 and a peelable lidding member 25. The receiving member 20 may define a cavity 15 configured to hold an item 10 therein.

The receiving member 20 may also define a peripheral portion 40 that at least partially surrounds the cavity 15. For example, the peripheral portion 40 in the depicted embodiment of FIGS. 2A and 2B extends around three sides of the cavity 15. In other cases, however, the peripheral portion may extend around four sides of the cavity (e.g., in cases of a square or rectangular cavity) or to the extent necessary and/or practicable to provide sufficient access to a consumer to withdraw the item from within the cavity.

The peelable lidding member 25 may be attached to the receiving member 20 and may be configured to cover the cavity 15 and retain the item 10 therein. With reference now to FIGS. 3A-5B, for example, the structure and construction of embodiments of the blister package 5 is described in greater detail. In embodiments such as shown in FIGS. 3A-5B, the peelable lidding member 25 may comprise a first film layer 45 that is configured to be attached to the peripheral portion 40 of the receiving member, and a second film layer 50 adhered to the first film layer via an adhesive layer 35 disposed between the first film layer and the second film layer.

The blister package 5 may be configured to be opened to provide access to the cavity 15 and the item 10 therein by peeling the peelable lidding member 25 away from the receiving member 20 (as shown in FIG. 2B). Due to the construction of the layers 45, 50 described above, the adhesive layer 35 may be configured to remain on the first film layer in the peripheral portion 40 as the blister package 5 is opened. In addition, a first portion 55 of the second film layer 50 may be configured to remain adhered to the first film layer 45 in a location corresponding to the cavity 15 when the peelable lidding member 25 is peeled away from the receiving member 20 so as to provide access to the item 10 therein.

At the same time, a second portion 60 of the second film layer 50 may be configured to be separated from the adhesive layer 35 in a location corresponding to at least part of the peripheral portion 40 as the blister package 5 is opened, such that the peelable lidding member 25 is resealable to the receiving member 20 when the second portion 60 of the second film layer 50 is moved into contact with a corresponding exposed portion 65 of the adhesive layer 35 via movement of the peelable lidding member 25 into contact with the receiving member 20. The exposed portion 65 is illustrated, for example, in FIGS. 3B, 4B, and 5B.

As noted above, the receiving member 20 may comprise a thermoformable material, such as, for example, an amorphous polyester material. For example, in some embodiments, the receiving member 20 may comprise glycol-modified polyethylene terephthalate (PETG). Correspondingly, in some embodiments, the first film layer 45 may comprise a polyester material, such as polyethylene terephthalate (PET), thereby allowing the first film layer 45 of the lidding member 25 to be heat sealed to the receiving member 20. The first film layer 45 may include, for example, a heat-activated layer to allow the first film layer to be heat-sealed to the receiving member. The second film layer 50 may comprise a metallized polyester material, such as metallized polyethylene terephthalate (mPET). Furthermore, the adhesive layer 35 may comprise a pressure sensitive adhesive (PSA). For example, in some cases, a surface of the first film layer 45 facing away from the receiving member 20 may be flood coated with PSA, such that the PSA is disposed between the receiving member 20 and the peelable lidding member 25, as shown in FIG. 2B. In other cases, however, other materials may be used. For example, in some cases, the receiving member 20 may be made of polyvinyl chloride (PVC), and a heat seal coating (e.g., an acrylic heat seal coating) may be used to allow the receiving member 20 to be heat-sealed to the peelable lidding member 25.

In still other embodiments, one or more ink layers may be provided on various layers of the peelable lidding member 25 to allow the package to be marked with the name and description of the product held inside (e.g., brand name, size, etc.), marketing information (e.g., information to entice consumers to purchase the product), instructions for use, hazards of use and/or other warnings, etc.

For example, with reference to FIG. 1, the brand name 70 of the product contained within the blister package 5 (in the depicted example, "Best Batteries") may be printed via an ink layer that is visible from the front of the package. Additionally or alternatively, another ink layer may be provided on the back of the package, as shown in FIGS. 2A and 2B, which may include instructions and other important information 75, or any other text. Accordingly, the blister package 5 may, in some cases, comprise a first ink layer 80 disposed between the first film layer 45 and the adhesive layer 35, as shown in FIGS. 3A-5B. The first ink layer 80 may, for example, be reverse-printed on the first film layer 45, such that the first ink layer is visible through the first film layer and the material of the receiving member 20 (e.g., when the receiving member and the first film layer are made of clear materials) and can be seen and understood by a consumer viewing the front of the package (FIG. 1). The adhesive layer 35 may be applied to the first ink layer 80 in such cases (e.g., flood coated), and the first film layer 45 with the ink layer 80 and the adhesive layer 35 may be laminated to the second film layer 50, as shown in FIGS. 3A-5B.

In some cases, the blister package 5 may further comprise a second ink layer 85 disposed on an outer surface of the second film layer 50. In this regard, after the second film layer 50 is laminated to the first film layer 45 (e.g., following application of the first, reverse-printed ink layer 80 and the adhesive layer 35), the second ink layer may be printed on the outer surface of the second film layer 50, such that it can be seen and understood by a consumer viewing the back of the package (e.g., as shown in FIGS. 2A and 2B). Because the first and second ink layers 80, 85 are on opposite sides of the second film layer 50, in embodiments in which the second film layer is metallized, the first ink layer may be seen only from the front of the package (FIG. 1), which the second ink layer may be seen only from the back of the package (FIGS. 2A and 2B).

Regardless of the presence of the ink layers 80, 85, in some embodiments the blister package 5 may further comprise at least one cut line arranged in a transverse direction with respect to the first and second film layers 45, 50 (e.g., in a direction through the thickness of the film layers). The cut line may be a cut that is mechanically formed (e.g., by a blade), made by a laser (such as a laser score line), or made in any other suitable manner. In still other cases, the cut line may be a line of weakness, such as a cut that does not go completely through a particular material or layer of material, or a series of perforations.

Regardless of how they are formed, the one or more cut lines may be configured (e.g., sized and shaped) to facilitate a user's opening of the package (e.g., via peeling of the peelable lidding member 25). For example, with reference to FIGS. 3A-3B, in some embodiments, the at least one cut line may comprise a first cut line that defines a break tab 30 (shown in FIGS. 1-2B) in the peripheral portion 40. For example, a first cut line 90 may be cut through the receiving member 20, and additional first cut lines 91', 91", 91''' may be cut through the lidding member 25 before the receiving member and the lidding member are attached to each other, such that when the lidding member is attached (e.g., heat sealed) to the receiving member 20, the first cut line 90 may be registered with (e.g., positioned to be aligned with) one of the additional cut lines 91', 91", 91''' to create the first cut line for the break tab 30. In FIG. 3A, for example, the lidding member 25 is attached to the receiving member 20 such that the first cut line 90 (which may be a line of weakness that does not extend through the whole thickness of the receiving member or a series of perforations) is registered with the first cut line 91" to create the break tab 30. The break tab 30 may be configured to be gripped by a user for peeling the peelable lidding member 25 away from the receiving member 20, as described above with reference to FIGS. 2A and 2B. In addition, the break tab 30 may further serve as a tamper evident feature, such that a user may be able to visually identify if the blister package 5 has been previously opened by seeing if the break tab 30 is connected to the rest of the receiving member 20 or has been broken off.

In some embodiments, a second cut line 92 may be provided that is defined on a first edge of the cavity 15, and a third cut line 94 may be provided that is substantially parallel to the second cut line 92 and is defined on a second edge of the cavity, opposite the first edge. The second and third cut lines 92, 94 may be defined through a thickness of the first film layer 45 and the adhesive layer 35 and may define a first portion 55' of the first film layer that is configured to remain adhered to the first portion 55 of the second film layer 50 as the lidding member 25 is being peeled away from the receiving member 20, as described above.

FIG. 3A shows a cross-section of the blister package 5 of FIG. 2A (in the closed position) along line 3A-3A, passing through the first cut line 90, through the second cut line 92, across the cavity 15, and through the third cut line 94. To make the manufacturing process more robust, in some embodiments, the first cut line 90 may be cut into the receiving member 20 and a series of parallel cut lines 91', 91", 91''' may be cut into the lidding member 25, respectively, prior to the lidding member 25 being heat sealed to the receiving member 20. As the lidding member 25 is applied to the receiving member 20, one of the cut lines 91', 91", 91''' is able to fall into alignment with the position of the first cut line 90, such that after the lidding member 25 has been heat sealed to the receiving member 20, the complete first cut line 90-91" passes through the material of the receiving member 20 (e.g., in the peripheral portion 40), through the first film layer 45, through the first ink layer 80, and/or through the adhesive layer 35. The additional cut lines 91', 91''' may thus be provided in the lidding member 25 to allow additional opportunities for alignment, in the event the first cut line 90 is more easily aligned with the cut line 91' or 91''', rather than with the cut line 91". The cut lines 91', 91", 91''' may, for example, be cut parallel to one another and may be spaced 1/16-inch or 1/8-inch apart. In other embodiments, fewer cut lines 91', 91", 91''' (e.g., two or one cut line) may be provided in the lidding member 25, whereas in still other embodiments greater than three cut lines may be provided through the lidding member. In some embodiments, the first cut lines 91', 91", 91''' may cut through a portion of the second film layer 50, but not all of it, whereas in other embodiments the first cut line may extend up to the first film layer 50, but may not cut into the first film layer 50. In still other embodiments, the first cut line 90-91" may be cut into the material of the receiving member 20 and the lidding member 25 after the two are attached, such that the break tab 30 is formed by a single cut.

The second and third cut lines 92, 94 may, in turn, be cut into the lidding member 25 after the first and second layers 45, 50 have been laminated to one another, but before the lidding member 25 is heat sealed to the receiving member 20. For example, as shown in FIG. 3A, the second and third cut lines 92, 94 may be cut through the first film layer 45, through the first ink layer 80, and/or through the adhesive layer 35. In some embodiments, the second and third cut lines 92, 94 may cut through a portion of the second film layer 50, but not all of it, whereas in other embodiments the first cut line may extend up to the first film layer 50, but may not cut into the first film layer 50.

By virtue of the position and extent of the first, second, and third cut lines 90, 92, and 94, when the break tab 30 is gripped and pulled by the user as described above, the lidding member 25 may be moved from the closed position shown in FIG. 3A to the open position shown in FIG. 3B, in which the second film layer 50 and portions of the first film layer 45 remain adhered to each other (e.g., the portion 55' remaining adhered to a corresponding portion 55 of the second film layer 50). Thus, by removing the first and second layers 45, 50 of the lidding member 25 that correspond to the area covering the cavity 15, the user may be able to gain access to the contents of the cavity 15 and may be able to withdraw the item 10 as necessary. Once a desired amount or quantity of the item 10 has been withdrawn (for example two out of four batteries), the user may be able to reseal the lidding member 25 to the receiving member 20 by re-closing the lidding member. In moving the lidding member 25 back into contact with the receiving member 20 (e.g., back to the position shown in FIG. 3A), the second portions 60 of the lidding member 25 may come into contact once more with the corresponding exposed portions 65 of the adhesive layer, thereby re-adhering the peelable lidding member 25 to the receiving member 20 to reseal the blister package.

Figure 4A:
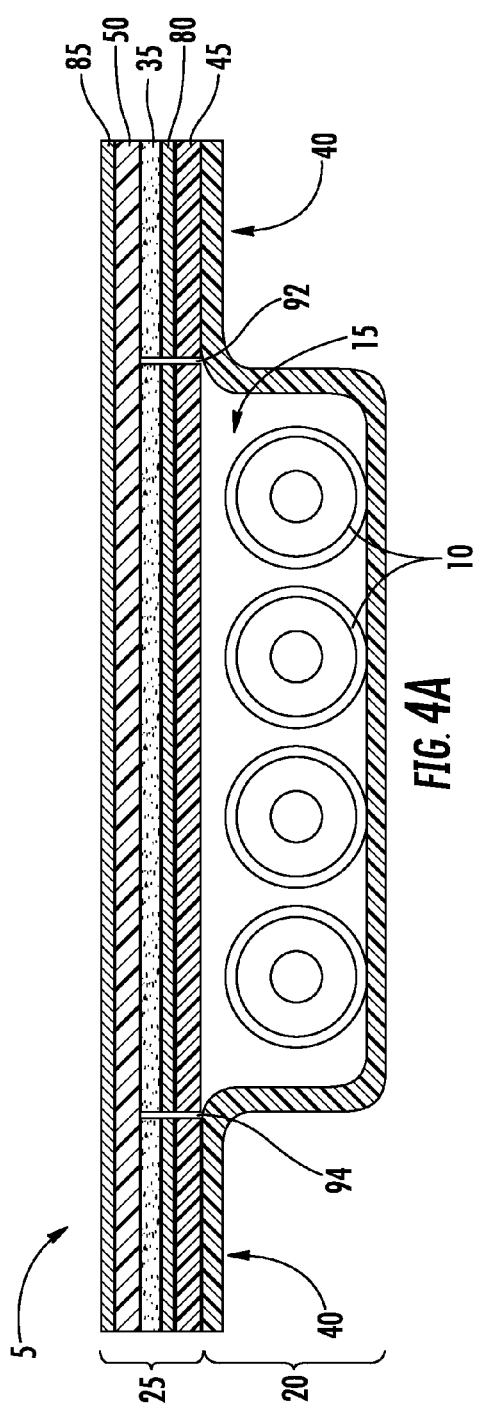
FIG. 4A is a cross-sectional view of the blister package of FIG. 2A along line 4A-4A according to an example embodiment.
Figure 4B:
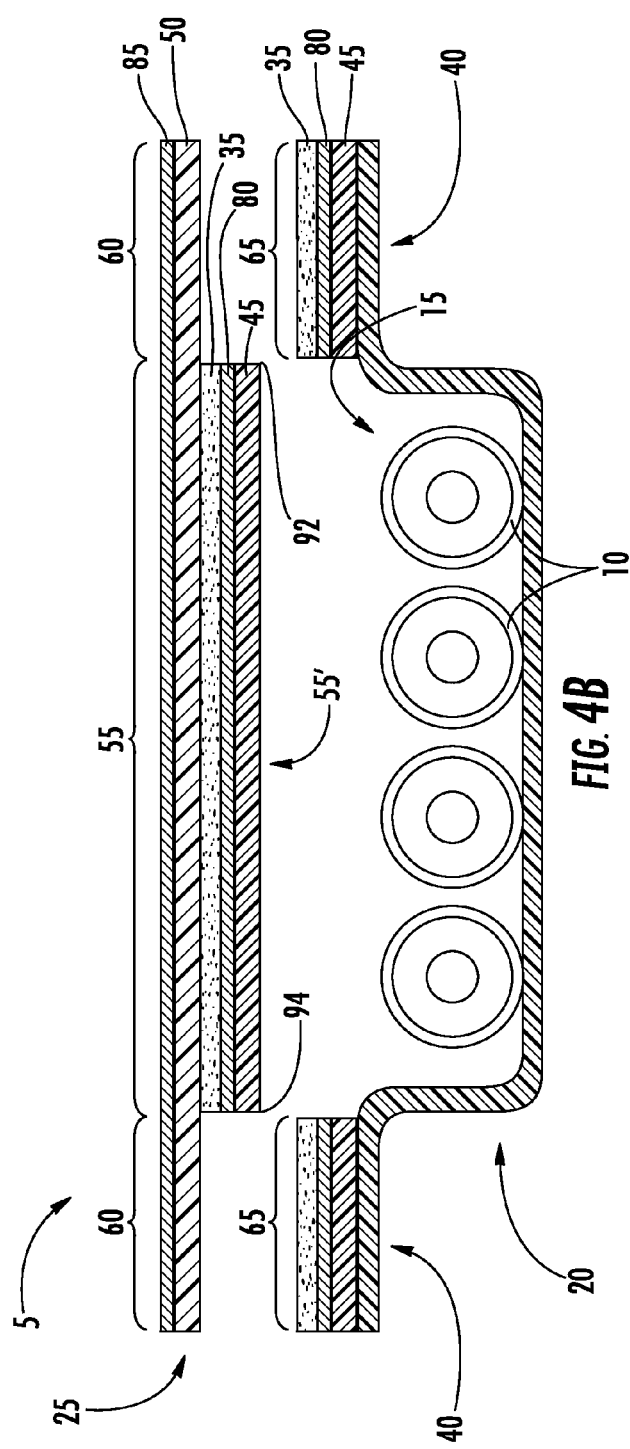
FIG. 4B is a cross-sectional view of the blister package of FIG. 2B along line 4B-4B according to an example embodiment.

FIGS. 4A and 4B show a cross-section that is parallel to that shown in FIGS. 3A and 3B, but is taken along a line that does not intersect the break tab 30 or the first cut line 90 defining the break tab. Accordingly, in FIGS. 4A and 4B, only the second and third cut lines 92, 94 are shown, which facilitate the opening of the cavity 15 for access by a user when the break tab 30 (of FIGS. 3A and 3B) is gripped and used to pull the peelable lidding member 25 away from the receiving member 20. In FIG. 4A, the blister package 5 is shown in a closed position corresponding to the position of FIG. 3A, and in FIG. 4B, the blister package is shown in an open position corresponding to the position of FIG. 3B, with the depicted portion of the lidding member 25 separated from the receiving member 20 to provide access to the item 10 held within the cavity 15.

Another cross-sectional view of the blister package 5 is shown in FIGS. 5A and 5B, in which the cross-section is taken along lines 5A-5A and 5B-5B of FIGS. 2A and 2B, respectively, generally perpendicular to the cross-sections of FIGS. 3A-4B. As illustrated in FIGS. 2A and 2B, in some embodiments a fourth cut line 96 may be provided that extends between the second and third cut lines 92, 94 (e.g., along a corresponding edge of the cavity 15) and allows the cavity to be accessible to the consumer when the break tab 30 is gripped and used to pull the peelable lidding member 25 away from the receiving member 20.

Accordingly, the position and extent of the fourth cut line 96, in cooperation with the first, second, and third cut lines 90, 92, and 94, allow the lidding member 25 to be moved from the closed position shown in FIG. 5A to the open position shown in FIG. 5B when the break tab 30 is gripped and pulled by the user as described above. In particular, the arrangement of cut lines 92, 94, 96 may allow the second film layer 50 to remain adhered to corresponding portions of the first film layer 45 (e.g., the portion 55' remains adhered to a corresponding portion 55 of the second film layer 50) as the peelable lidding member 25 is opened. Thus, by removing the first and second layers 45, 50 of the lidding member 25 that correspond to the area covering the cavity 15, the user may be able to gain access to the contents of the cavity 15 and may be able to withdraw the item 10 as necessary. As noted above, once a desired amount or quantity of the item 10 has been withdrawn (for example two out of four batteries), the user may be able to reseal the lidding member 25 to the receiving member 20 by re-closing the lidding member. In moving the lidding member 25 back into contact with the receiving member 20 (e.g., back to the position shown in FIG. 5A), the second portions 60 of the lidding member 25 may come into contact once more with the corresponding exposed portions 65 of the adhesive layer 35, thereby re-adhering the peelable lidding member 25 to the receiving member 20 to reseal the blister package 5.

In some embodiments, a fifth cut line 98 may be provided opposite the fourth cut line 96, as shown in FIGS. 2A-2B and 5A-5B. The fifth cut line 98 may, along with the second, third, and fourth cut lines 92, 94, 96, form a generally continuous cut line around the perimeter of the cavity 15 opening. In some cases, the adhesive layer 35 in a region of the lidding member 25 corresponding to the first portion 55 may comprise PSA, as described above, whereas the adhesive layer 35 in another region 62 of the lidding member in a hang tab portion 42 of the blister package 5 (e.g., the portion of the package that includes a hole 7 for receiving a display hook, as shown in FIGS. 1-2B) may comprise permanent adhesive. The permanent adhesive in the region 62 may prevent a user from completely separating the peelable lidding member 25 from the receiving member 20, thereby facilitating the process of resealing the lidding member to the receiving member (e.g., by maintaining the alignment between the two).

In other embodiments (not shown) the fifth cut line 98 may not be provided. In such cases, for example, the PSA of the adhesive layer 35 may extend from the first portion 55 into the region 62 of the hang tab portion 42 of the receiving member 20, and the user may be able to pull the peelable lidding member 25 past the opening of the cavity 15 and, in some cases, completely separate it from the receiving member 20, if so desired. In still other embodiments in which the fifth cut line 98 is not provided, the adhesive layer 35 in the region 62 of the hang tab portion 42 may comprise permanent adhesive, such that the user is unable (or must use a great deal more force) to separate the peelable lidding member 25 from the receiving member 20 in the region 62 of the hang tab portion 42, regardless of the presence of the fifth cut line 98.

The second, third, fourth, and/or fifth cut lines 92, 94, 96, 98 provided to define the first portion 55' of the first film layer 45 that is configured to remain adhered to the first portion 55 of the second film layer 50 as the lidding member 25 is being peeled away from the receiving member 20 may, in some cases, comprise a single (e.g., continuous) cut line. In other cases, however, the cut lines 92, 94, 96, 98 may be discontinuous or formed separately, but may cooperate to define the first portion 55' of the first film layer 45 when the lidding member 25 is peeled away from the receiving member 20.

Accordingly, as described above, a corresponding method of manufacturing a blister package is also provided, in which a receiving member is thermoformed to an appropriate size and shape for holding a particular item, such as batteries. The receiving member may, for example, define a cavity configured to hold an item therein and a peripheral portion at least partially surrounding the cavity. A first film layer may be laminated to a second film layer via an adhesive layer to form a peelable lidding member. A cut line may be defined in a transverse direction with respect to the first and second film layers, wherein the cut line passes through at least the receiving member and the first film layer so as to define a break tab in the peripheral portion. For example, a series of parallel cut lines may be defined in the peripheral portion of the lidding member, and a corresponding cut line may be defined in the receiving member in a transverse direction with respect to the first and second film layers. The peelable lidding member may be heat sealed to the peripheral portion of the receiving member, and when one of the cut lines of the series of the cut lines in the lidding member is aligned with the cut line of the receiving member, as described above, the cut lines may, for example, pass through at least the receiving member and the first film layer so as to define a break tab in the peripheral portion.

The break tab may be configured to be gripped by a user for peeling the peelable lidding member away from the receiving member to provide access to the cavity and the item therein. Moreover, the peelable lidding member may be configured to be resealed to the receiving member via the adhesive layer.

The first film layer may comprise a heat sealable polyester material configured to be heat sealed to the peripheral portion of the receiving member. The second film layer may comprise a metallized polyester material adhered to the first film layer via the adhesive layer. The first film layer may be laminated to the second film layer by flood coating the first film layer with a pressure sensitive adhesive.

In some cases, an ink layer may be reverse-printed on the first film layer, and the adhesive layer may be applied over the ink layer. Another ink layer may be printed on an outer surface of the second film layer.

In some embodiments, wherein the cut line is a first cut line, the method may further comprise forming a second cut line on a first edge of the cavity and forming a third cut line substantially parallel to the second cut line on a second edge of the cavity, opposite the first edge, wherein the second and third cut lines are defined through at least a thickness of the first film layer and facilitate access to the cavity when the peelable lidding member is peeled away from the receiving member.

In some cases, as described above, a fourth cut line may be formed that extends between the second and third cut lines along a third edge of the cavity. The fourth cut line may be defined through at least a thickness of the first film layer and, with the second and third cut lines, may form a substantially continuous cut along a portion of the perimeter of the cavity (e.g., three sides of a four-sided cavity), thereby allowing the first film layer to be removed with the second film layer via the adhesive layer in the area inside the cut lines so as to provide access to the cavity when the peelable lidding member is peeled away from the receiving member. Additional cut lines (e.g., a fifth cut line) may also be provided in some cases, as described above. Moreover, portions of the adhesive layer may comprise PSA, whereas other portions (e.g., portions within which the first film layer is intended to remain with the second film layer) may comprise permanent adhesive, as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A blister package comprising:
   a receiving member defining a cavity configured to hold an item therein and a peripheral portion at least partially surrounding the cavity, wherein the receiving member comprises a thermoformable material; and
   a peelable lidding member attached to the peripheral portion of the receiving member and configured to cover the cavity and retain the item therein, the lidding member comprising:
      a first film layer comprising a heat sealable polyester material configured to be attached to the peripheral portion of the receiving member, and
      a second film layer comprising a metallized polyester material laminated to the first film layer via an adhesive layer,
   wherein the blister package is configured to be opened to provide access to the cavity and the item therein by peeling the peelable lidding member away from the receiving member,
   wherein a first portion of the second film layer is configured to remain adhered to the first film layer in a location corresponding to the cavity, such that the first film layer is removed with the first portion from the location corresponding to the cavity when the peelable lidding member is peeled away from the receiving member so as to provide access to the item therein,
   wherein a second portion of the second film layer is configured to be separated from the adhesive layer in a location corresponding to at least part of the peripheral portion as the blister package is opened, with the adhesive layer remaining on the first film layer, such that the peelable lidding member is resealable to the receiving member when the second portion of the second film layer is moved into contact with a corresponding exposed portion of the adhesive layer,
   wherein a series of cut lines are arranged around the edges of the cavity and through at least a thickness of the first film layer such that the cut lines form a closed continuous area along the perimeter of the cavity defining a portion of the first film layer that is configured to remain adhered to the second film layer when the peelable lidding member is peeled away from the receiving member, and wherein the adhesive layer in a hang tab region of the package comprises a permanent adhesive, and
   wherein the package further comprises a transverse cut line formed through the receiving member, and a series of parallel transverse cut lines formed through the lidding member, such that the transverse cut line formed through the receiving member is aligned with one of series of cut lines formed through the lidding member to create a break tab.

2. The blister package of claim 1, wherein the receiving member comprises glycol-modified polyethylene terephthalate (PETG).

3. The blister package of claim 1, wherein the first film layer comprises polyethylene terephthalate (PET).

4. The blister package of claim 1, wherein the adhesive layer in other regions of the package comprises pressure sensitive adhesive.

5. The blister package of claim 1, wherein an ink layer is disposed between the first film layer and the adhesive layer.

6. The blister package of claim 1, wherein the second film layer comprises metallized polyethylene terephthalate (mPET), and wherein a first ink layer is disposed between the first film layer and the second film layer, and a second ink layer is disposed on an outer surface of the second film layer, such that the first ink layer may only be seen from one side of the package and the second ink layer may only be seen from an opposite side of the package.

* * * * *